(12) United States Patent
Hoffman et al.

(10) Patent No.: US 10,638,555 B2
(45) Date of Patent: Apr. 28, 2020

(54) FLUID TRANSPORT USING INDUCTIVE HEATING

(71) Applicant: Hydra Heating Industries, LLC, Atlanta, GA (US)

(72) Inventors: Michael Hoffman, Foley, AL (US); Shuping Wang, Minneapolis, MI (US)

(73) Assignee: Hydra Heating Industries, LLC, Atlanta, GA (US)

(*) Notice: Subject to any disclaimer, the term of this patent is extended or adjusted under 35 U.S.C. 154(b) by 144 days.

(21) Appl. No.: 15/621,000

(22) Filed: Jun. 13, 2017

(65) Prior Publication Data

US 2017/0355530 A1    Dec. 14, 2017

Related U.S. Application Data

(60) Provisional application No. 62/349,283, filed on Jun. 13, 2016.

(51) Int. Cl.

| | |
|---|---|
| *B65G 53/48* | (2006.01) |
| *H05B 6/44* | (2006.01) |
| *B65D 88/74* | (2006.01) |
| *H05B 6/10* | (2006.01) |
| *B65G 69/20* | (2006.01) |
| *B65G 53/52* | (2006.01) |
| *B65G 33/14* | (2006.01) |

(52) U.S. Cl.
CPC ............... *H05B 6/44* (2013.01); *B61D 5/04* (2013.01); *B65G 53/48* (2013.01); *B65G 53/526* (2013.01); *B65G 69/20* (2013.01); *H05B 6/108* (2013.01); *B65G 33/14* (2013.01)

(58) Field of Classification Search
CPC ...... B65G 53/48; B65G 53/526; B65G 69/20; B65G 33/14; H05B 6/36; H05B 6/40; H05B 6/44; H05B 6/108; B61D 5/04
See application file for complete search history.

(56) References Cited

U.S. PATENT DOCUMENTS

| | | | | |
|---|---|---|---|---|
| 2,879,366 A * | 3/1959 | Tudbury | ................. | H05B 6/36 |
| | | | | 219/672 |
| 3,990,612 A * | 11/1976 | Gasser | ................. | B65D 83/72 |
| | | | | 222/146.5 |
| 4,137,483 A * | 1/1979 | Ochi | ................. | H01J 61/544 |
| | | | | 315/47 |
| 5,990,465 A * | 11/1999 | Nakaoka | ................. | H05B 6/108 |
| | | | | 219/629 |
| 6,046,442 A * | 4/2000 | Kawamura | ............... | H05B 6/06 |
| | | | | 219/667 |
| 7,115,845 B2 * | 10/2006 | Nomura | ................. | B24B 49/105 |
| | | | | 219/630 |

(Continued)

*Primary Examiner* — Nicolas A Arnett
(74) *Attorney, Agent, or Firm* — Thomas | Horstemeyer, LLP (57) ABSTRACT

Aspects and embodiments of systems for fluid transportation using inductive heating are described. In one embodiment, the system includes a first transportation pipe having a first diameter and a second transportation pipe having a second diameter. The first diameter is greater than the second diameter. An augur that causes a fluid flow is within the first transportation pipe. A control circuit is electrically coupled to the first inductive element and the second inductive element, and to a power supply to inductively heat the first transportation pipe and the second transportation pipe.

15 Claims, 5 Drawing Sheets

(56) References Cited

U.S. PATENT DOCUMENTS

| | | | |
|---|---|---|---|
| 7,145,114 B2* | 12/2006 | Wakamatu | B24B 49/105 |
| | | | 219/629 |
| 8,647,401 B2* | 2/2014 | Self | C10J 3/66 |
| | | | 219/600 |
| 9,140,445 B2* | 9/2015 | Tomita | F22B 1/284 |
| 10,335,222 B2* | 7/2019 | Hoey | A61B 18/04 |
| 2017/0069489 A1* | 3/2017 | Sun | H01L 21/768 |

* cited by examiner

FLUID TRANSPORT USING INDUCTIVE HEATING

CROSS-REFERENCE TO RELATED APPLICATIONS

This application claims the benefit of U.S. Provisional Application No. 62/349,283, filed Jun. 13, 2016, titled "System for Transporting Heavy Oils with Induction," which is hereby incorporated herein by reference in its entirety.

BACKGROUND

Fluids such as waste oil can include a combination of hydrocarbons, oils, gasses, water, other liquids and solids obtained naturally or as a residue from processing. Fluids such as tar sands include a combination of clay, sand, water, and bitumen, which is a black viscous mixture of hydrocarbons obtained naturally or as a residue from petroleum distillation. Tar sands can be mined and processed to extract the oil-rich bitumen, and the bitumen can be refined into oil. The recovery of oil from the bitumen in tar sands requires extraction and separation systems to separate the bitumen from the clay, sand, and water that make up the tar sands. Because these fluids and other base materials are so viscous, waste fluids can be difficult to process and transport using pipelines and tank cars.

BRIEF DESCRIPTION OF THE DRAWINGS

Aspects of the present disclosure can be better understood with reference to the following drawings. It is noted that the elements in the drawings are not necessarily to scale, with emphasis instead being placed upon clearly illustrating the principles of the embodiments. In the drawings, like reference numerals designate like or corresponding, but not necessarily the same, elements throughout the several views.

DETAILED DESCRIPTION

As noted above, some fluids can be very viscous, and can be difficult to process and transport. These fluids can include tar sands, bitumen, waste oils, waste plastics, and other viscous fluids. The present disclosure describes systems and methods for fluid transport using inductive heating. The systems and methods described can help processing and transportation of these fluids, and in some cases can help extract valuable or useful materials from these fluids. The device can receive very viscous fluids and heat the fluid inductively to decrease viscosity for processing and transportation.

Transportation pipes such as those used in pipelines and other piping applications can include various types of metals including steel and other appropriate metals. Grades of steel vary in chemical composition, and can include carbon manganese, multi-element and micro-alloyed compositions having various material specifications and pipe grades. Transportations pipes can meet ASTM specifications, API 5L specifications, CSA Z245.1 specifications, schedule 80 steel pipe, and other specifications to match the application. Such transportation pipes can be used to transport fluids including liquid and/or gaseous substances as well as those mixed with solids.

Truck trailer tanks, rail tank cars, and tank wagons are types of transportation tanks that can also be designed to transport fluids including liquid and/or gaseous substances as well as those mixed with solids. The U.S. DOT-111 and DOT-117, DOT-117/R are examples of transportation tanks used in North America. As an example, transportation tanks built to the DOT-117 specification should be circular in cross section, having a minimum plate thickness of $9/16$ inch and a maximum capacity of 34,500 US gallons. Heat shields should be ½ inch. Transportation tanks built to the U.S. DOT-117 specification can be constructed from carbon steel, aluminum alloy, high alloy steel, nickel plate steel, or another suitable material by fusion welding. Accordingly, many such transportation tanks can be inductively heated.

Once diluted into dilbit, bitumen can be transported in transportation tanks such as those built to the U.S. DOT-111 specification, ASTM specifications, API 5L specifications, and/or CSA Z245.1 specifications, among others. It would be preferable (e.g., cheaper, safer, less time consuming, etc.), however, to transport bitumen without the need to use a diluting agent or diluent such as NGC. The present disclosure can allow transportation of dilbit (e.g., about 30% diluent) and other diluted bitumen like lesser-diluted railbit (e.g., around 17% diluent), as well as rawbit and undiluted bitumen, as well as waste oils, waste plastics, and other fluids.

Because of the variety of different types of liquids and gases that can be transported in tank cars, different types of transportation tanks can be pressurized or non-pressurized, insulated or non-insulated, and designed for carrying one or several different types of substances. Depending upon the type of substance it is designed to transport, the interior of a transportation tank can be lined with glass or another suitable coating to isolate the contents of the tank from the shell of the tank. Transportation tanks carrying dangerous goods are generally made of different types of steel, depending on the intended cargo and operating pressure. Such transportation tanks can also be lined with rubber or coated with specialized coatings for the protection of the tank or to protect the purity of the product being transported. In some cases, these linings and surroundings can be used for transportation pipes as well.

To aid in transport of fluids, including those without a diluting agent, viscosity can be reduced by inductive heating. According to aspects of the embodiments, bitumen (and/or other substances) can be heated in rail tank cars, truck tank cars, pipelines, etc., using electromagnetic induction.

An electrically conducting object (e.g., a metal) can be heated by electromagnetic fields using electromagnetic induction. Specifically, in electromagnetic induction, an electrically conducting object is heated by eddy currents induced in it by electromagnetic induction. As one example of the process of induction heating, a high-frequency alternating current (AC) can be passed through a wire or coil positioned closely to or wrapped around an electrically conducting object. A high-frequency alternating magnetic field is then generated around the wire or coil and penetrates the electrically conducting object. Due to the high- or mid-frequency alternating magnetic field (e.g., around 100-500 kHz or greater), electric currents, called eddy currents, are generated inside the electrically conducting object. The eddy currents heat the electrically conducing object by the magnetic resistance inherent in the heated object. As also described in this document, lower frequencies, such as line frequencies (e.g., 50, 60, 140, 400 Hz) can be used to alternate the magnetic field.

For ferrous metals like iron and some types of steel, an additional heating mechanism beyond eddy currents occurs. Particularly, the alternating magnetic field inside the coil repeatedly magnetizes and de-magnetizes iron crystals in the electrically conducting object. This flipping of the magnetic domains causes considerable friction and heating inside the object. Heating due to this mechanism is known as hysteresis loss and is greater for materials having a large area inside their magnetic flux density (B)/magnetic field strength (H) curve. Hysteresis loss can be a large contributing factor to heat generated through induction.

Using induction heating, an electrically conducing object can be directly and rapidly heated without using conduction. Because conduction is not relied upon, there is no need to make contact with the object being heated. Induction heating is used in many industrial processes, such as heat treatment in metallurgy, crystal growth in the semiconductor industry, and to melt refractory metals which require very high temperatures. Induction heating is also used in certain cooktops for cooking.

To understand the mechanics, let us refer to the standard equation for the transfer of thermal energy.

$$mc_p \frac{dT}{dt} = UA(T_s - \overline{T}) \quad (1)$$

In equation (1), m is the mass of material to be heated, cp is the material's specific heat capacity, T is the average temperature of the material, t is time, UA is the coefficient of heat transfer, Ts is the surface temperature of the tank shell. cp and UA can be constants. UA, can be enhanced, in some cases by 100%, due to nitrogen injection during induction heating. As can be seen, for example, in FIG. 6, the rate of temperature increase can be much higher for induction heating versus that for steam. In some cases, the maximum surface temperature attained using steam can be 150° C. whereas induction heating is capable of heating rawbit to 300° C.

In the context outlined above, aspects and embodiments of systems and methods for fluid transport using inductive heating are described. In some embodiments, a system for fluid transportation can include a first transportation pipe can have a first diameter and a first inductive element that heats the first transportation pipe. A second transportation pipe can have a second diameter and a second inductive element that heats the second transportation pipe. The first diameter of the first transportation pipe can be greater than the second diameter of the second transportation pipe. An augur within the first transportation pipe can causes a fluid flow within a transportation piping assembly comprising the first and second transportation pipes. In some cases, an entrance funnel can be connected to a top of the first transportation pipe and can feed a fluid over the augur and into the first transportation pipe. In further examples An exit element that is configured to inject fluid into a transportation tank. The system can include a control circuit that is electrically coupled to the first inductive element and the second inductive element, and further to a power supply to inductively heat the first transportation pipe and the second transportation pipe. In some cases, the control circuit measures a temperature using a thermocouple and controls the first inductive element to maintain the temperature below a predefined threshold temperature.

In some embodiments, the control circuit causes the second transportation pipe to be heated to a predefined temperature in a range between approximately 200° C.-300° C. In some embodiments, the transportation tank comprises an inductive element.

In some examples, the system can include a third transportation pipe having a third diameter and a third inductive element that heats the third transportation pipe, and the third transportation can be connected between the first transportation pipe and the second transportation pipe, and the first diameter is greater than the third diameter, and the third diameter is greater than the second diameter. In some cases, another augur can be within the third transportation pipe. The augur can cause a first flow rate, the another augur can cause a second flow rate, and the first flow rate can be similar to the second flow rate. In some embodiments the first inductive element can be a liquid-cooled inductive element that includes at least one valve assembly.

In some cases, inductive units and the control system can cause the inductive elements to use frequency of a power source (e.g., a generator or utility power) as the frequency emitted by the inductive heater. This frequency can be as line frequency or utility frequency (e.g., 50 Hz, 60 Hz, 140 Hz, 400 Hz, etc.). In some embodiments, lower frequencies can penetrate the pipes, vessels or conduits of a heater assembly deeper than higher frequencies. Frequency can be chosen or designed to match the requirements of the application, including power source, and heater assembly.

Figure 1A:
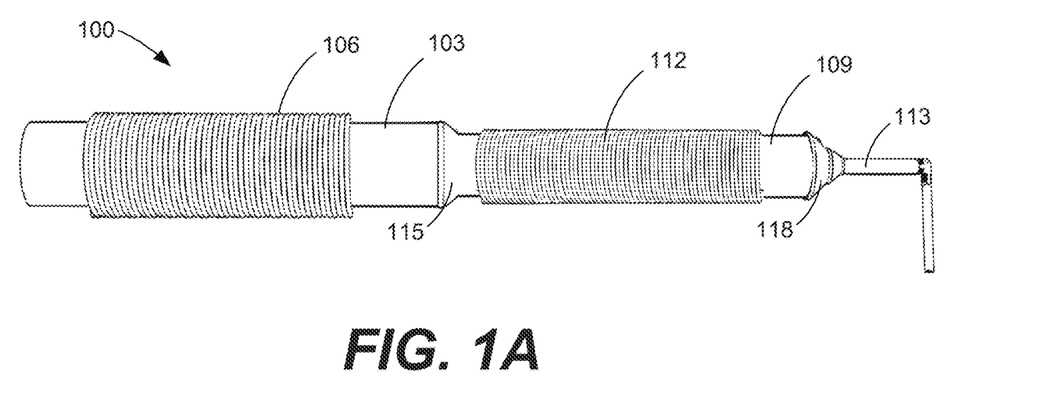
FIGS. 1A and 1B are drawings that illustrate views of a transportation piping assembly according to one embodiment of the present disclosure.

Moving now to the figures, FIG. 1 illustrates an transportation piping assembly 100. The transportation piping assembly 100 can include a transportation pipe 103 and in some cases, one or more additional transportation pipe 109. The transportation pipe 103 can include an inductive heating element 106, which can be an inductive coil that encircles the transportation pipe 103 or another inductive heating element. In other cases, the inductive heating element can be otherwise oriented along the transportation pipe 103. A reducer 115, like a reducing coupling or other reducer can connect the larger transportation pipe 103 to the smaller transportation pipe 109. The transportation pipe 109 can include an inductive heating element 112, which can be an inductive coil that encircles the transportation pipe 109 otherwise oriented along the transportation pipe 109. A reducer 118 like a reducing coupling or other reducer can be connected to a spout, pipe, or other output or exit element 113 that is configured to inject fluid into a transportation tank, such as a rail car or a truck trailer, for example, has a size or diameter or output fitting that allows the fluid to be injected into such a transportation tank.

Figure 1B:
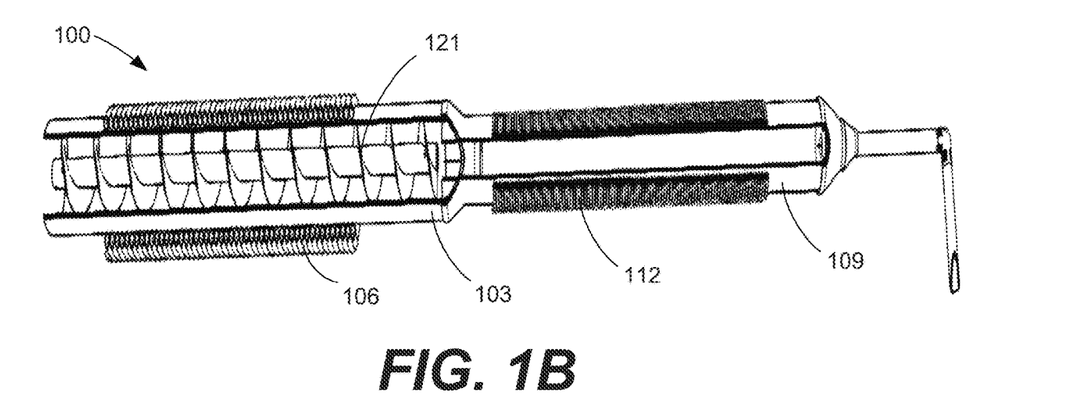

FIG. 1B illustrates a cutaway view of the transportation piping assembly 100. As can be seen, in some cases, the transportation pipe 103 can be an augur pipe 103. Accordingly, the transportation pipe 103 can move very viscous fluids, such as near solid or solid bitumen, or other substances towards a transportation tank. Starting at an entrance of the transportation pipe 103, the fluid can be transported using a screwing action of an augur 121 of the transportation pipe 103. In other cases, no augur is used in the transportation pipe (e.g., where viscosity is lower and permits omission of the augur). In such cases, pumps such as positive displacement pumps can be used to cause a flow within the piping assembly 100.

The augur 121 can include a screw shaped or helical structure that causes a flow of the fluid within the transportation piping assembly 100. The augur 121 can be made from metal or other appropriate materials, including those used for the pipes as discussed. The augur 121 can also serve to break up tough materials including solids within the fluid. The augur 121 can be rotated within the transportation pipe 103 using any suitable source of rotation. In some cases, the augur 121 can be rotated using one or more electric motors, combustion engines, as well as gears, drive shafts and other suitable rotation machinery. In some cases, a pump such as a positive displacement pump or another appropriate pump can be used to move the fluid through the transportation pipe 103, in addition to, or alternatively to the augur 121.

The fluid can be screwed or moved using the augur 121 while also being heated using the induction elements 106. As the fluid is heated it can become less viscous and can be forced into the narrower transportation piping 109. In some embodiments, multiple narrowing events can exist, such as the reducers 115 and 118. In the various embodiments, additional or fewer narrowing or reducing diameter piping may be useful as engineering dictates. In one situation, multiple transportation pipes can include augurs, even as the system is narrowed into successively reduced-diameter transportation pipes with reduced-diameter augurs.

Where multiple transportation pipes having augurs are used, each augur, and its respective rotation and/or thread, can be different, and can be designed such to allow for proper flow of the volume of fluid through various diameters of transportation pipes. Namely, the rotational speed (e.g., RPM) of a smaller diameter augur of a smaller diameter transportation pipe can be different (e.g., faster or slower) than a larger diameter augur of a larger diameter transportation pipe that feeds it. For example, rotational speed of the smaller augur can be greater than the rotational speed of the larger augur. Further, the threads or helical structure of the smaller diameter augur of the smaller diameter transportation pipe can be different (e.g., greater or lesser threads per unit length) than threads of the larger diameter augur of the larger diameter transportation pipe that feeds it. For example, threads and rotational speed can be designed so that the volume moved over time or another measure of flow rate is similar for adjacent transportation pipes, although each pipe can have a successively smaller diameter pipe having a successively smaller diameter augur. In other cases, the flow rates can be different.

In some examples, multiple transportation feeding pipes, having features as described for the various transportation pipes (e.g., augured or non-augured, can be fed at the source using a funnel, grinder, etc.) can be used to accept the fluid from its source, and can feed into the transportation pipe 103. In such cases, the transportation pipe 103 can be designed to be large enough to accept the materials being fed into the transportation pipe 103. Accordingly, a spice or tee type adapter can be used between the multiple transportation feeding pipes and the transportation pipe 103. The transportation pipe 103 can have a diameter larger than each of the transportation feeding pipes. In other cases, each transportation feeding pipe can which can have an output element that injects or pours the fluid into the top of the transportation pipe 103, and in some cases into one or more chopper, grinder, or funnel that feeds into the transportation pipe 103 (and in some cases onto an augur of the transportation pipe 103). Accordingly, the transportation pipe 103 can include multiple such choppers, grinders, or funnels that feed into the transportation pipe 103 to accept fluid from a source or from a transportation feeding pipe. In some examples, a transportation feeding pipe can be inductively heated or not inductively heated. Where not inductively heated, the heating can be achieved through the transportation piping assembly 100 as discussed.

As shown in the FIG. 1B, the transportation pipe 109 can be a transportation pipe without an augur. The fluid being transported within the transportation piping assembly 100 can have viscosity reduced, for example, through the inductive heating using the inductive elements 106 that can heat the wall of the transportation pipe 103 (and the augur 121). The fluid or other substances continues to heat with induction coils 112 along the length of the transportation pipe 109. The throughput of the arrangements in FIGS. 1A and 1B can variable with the increase or decrease in rotation. For example, in some situations, rotation of the augur 121 (and additional augurs) can be used to push the fluid through the entire transportation piping assembly 100, including through a number of transportation pipes like the transportation pipes 103 and 109. Also, additionally or alternatively, one or more pumps can be used to move the fluid.

In some cases, one or more of the transportation pipes of the transportation piping assembly 100 can be considered a pyrolytic chamber. For example, the transportation pipe 109 can be a pyrolytic chamber. Pyrolysis in the pyrolytic chamber can cause thermochemical decomposition of organic material at elevated temperatures in the absence of oxygen, or any halogen. In some cases, this can cause a change of chemical composition and physical phase, which can be irreversible. Changes from pyrolysis can be different from changes caused by combustion or hydrolysis, as pyrolysis does not involve reactions with oxygen, water, or any other reagents, or a minimum of such reactions. Because some oxygen can be present in a pyrolytic chamber, a small amount of oxidation can nevertheless occur. In some cases, pyrolysis can occur around 200-300° C. (390-570° F.) or greater for organic material. In some cases, pyrolysis can occur around 450° C. (842° F.) or greater for plastic materials.

In general, where the fluid is organic or partially organic, pyrolysis can produce gas products, liquid products, and a solid char, or residue that is higher in carbon content. Accordingly, as the temperature in the transportation piping assembly 100 continues to increase, up to these temperatures, pyrolysis can occur. Accordingly, the transportation pipe 109 can be a pyrolytic chamber if designed to have a temperature around 200-300° C. The transportation pipe 109 can be used to produce char, such as charcoal or other products, natural gas or other hydrocarbon gasses, natural gas liquids, and other products.

In some cases, the transportation piping assembly 100 can be used to condition or process the fluid. Conditioning the fluid can include removal of water, or other items from the fluid. Removal of water can be achieved by maintaining a temperature that is above 100° C. or below a threshold temperature that is above a boiling point of water. Removal of water, diluent, or other materials can, for example, be achieved by maintaining a temperature that is above a boiling point of the material to be removed. Also, in some cases, the heating in the transportation piping assembly 100 can be used to cause water within the fluid, or injected into the fluid, to be supercritically heated to 374° C. (705 F), or greater. For example, supercritical water can be used to draw out sulfur from the fluid within the transportation piping assembly 100.

In some examples, removal ports such as slits or holes in a top of a transportation pipe can be used to allow evaporation or removal of water, diluent, natural gas, or other materials. In some cases, water, diluent, natural gas, or other materials can be siphoned off and collected through the slits or holes, or through a column, flue, or stack to collect the materials.

In some examples, injection ports can be used at one or more reducer between an augur transportation pipe and an open transportation pipe. Injection ports can also be at any point along the transportation pipes. The injection ports can allow for injecting, mixing, or diluting the fluid with steam or other types of material injections. In some cases, an insulation layer can surround each of the transportation pipes, for example, between the induction elements and the transportation pipes, and/or over the transportation pipes and induction elements together.

Figure 2:
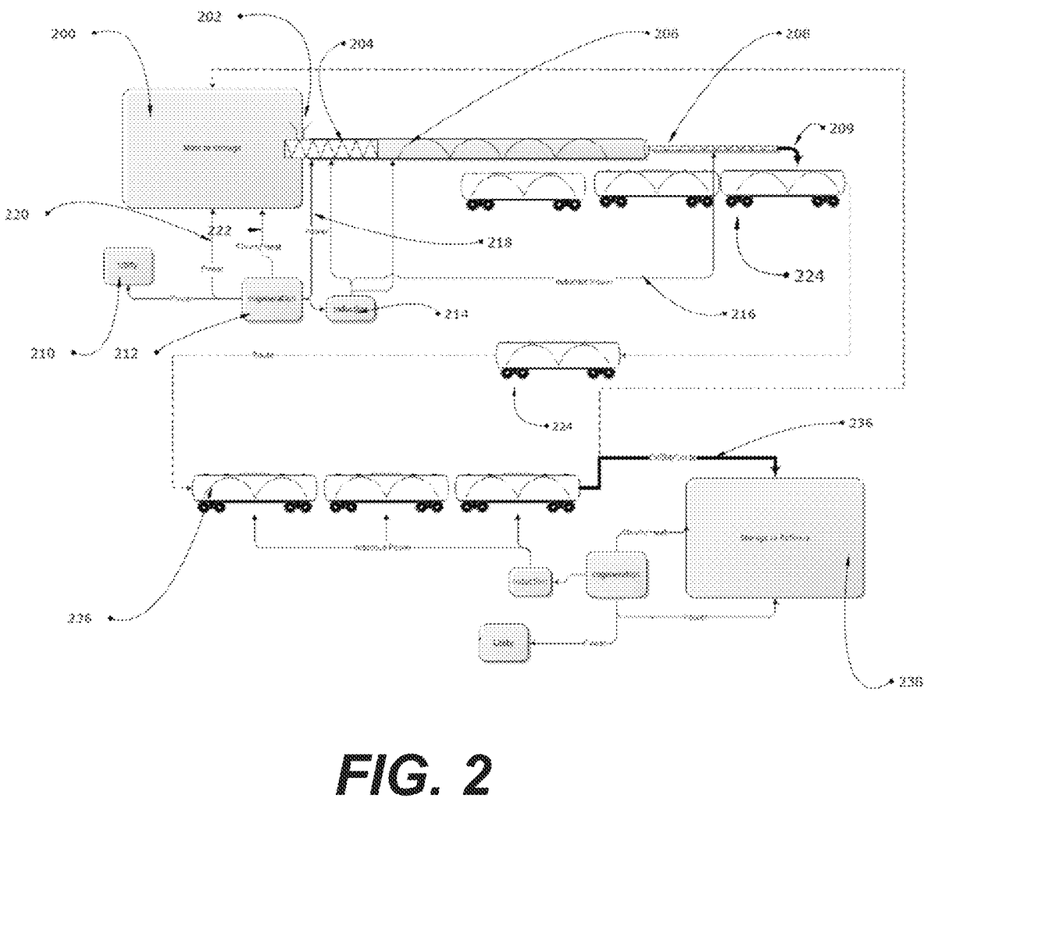
FIG. 2 is a diagram that illustrates an example of fluid transport using inductive heating according to one embodiment of the present disclosure.

FIG. 2 shows an example of fluid transport using inductive heating according to one embodiment of the present disclosure. A mine or a storage facility 200 can have some fluid or other substances as discussed. The fluid can be fed into an opening, such as a tapered or funneled opening of an augur transportation pipe. The tapered opening can be in a top surface of the augur transportation pipe above an augur 204 of the augur transportation pipe. In some cases, a grinding device, chopping device, or other such device can be used additionally or alternatively to feed the transportation pipe such as an augur pipe or open pipe of the transportation piping system.

The augur transportation pipe can also include an inductive element 206 to heat the transportation pipe, in some cases, including the augur. The augur can extend substantially for the length of the augur transportation pipe, and in other cases, only extend through a portion of the augur transportation pipe at a first end, for example, for a predetermined length to heat the fluid and reduce its viscosity such that it can flow through the transportation pipe assembly.

The transportation piping assembly shown can progressively narrow, for example, into a transportation pipe 208 (e.g., augur or non-augur transportation pipe) and can heat for delivery for example, through an output element 209 into a transportation tank. In some cases, transportation tanks 224 can include inductive elements 226 much like those of the transportation piping assembly, and can be considered part of the system for fluid transport using inductive heating. The inductive elements 226 of the transportation tanks 224 can keep the fluid warmed within, and/or re-heat the fluid once they arrive at a destination, such as the storage or refinery destination facility 238, so the fluid can be moved through additional transportation pipes at the destination facility 238. In other cases, the transportation tanks can be any transportation tanks. The destination facility 238 can include a transportation piping assembly and additional transportation pipes as discussed for FIG. 1, and elsewhere in FIG. 2.

The inductive elements of the system can be heated using an inductive unit 214 (for example, as further described in FIG. 5 or another type of inductive unit) that provides inductive power 216 to the induction coils or elements the system, including those of the transportation pipes, as well as those of the transportation tanks (e.g., while relatively stationary or on-site). Cogeneration 212 fuel can be supplied by hot waste oil heaters. Excess power 220 and steam 222 can be fed back to the mine and excess electricity 210 can be supplied to utility lines, and in some cases sold back to the utility. The filled transportation tanks 224 can be routed to storage, refiner, or another destination facility 238 where the induction elements 226 of the transportation tanks can be powered via wires or cables via an induction unit of the destination facility 238, which can be much like the inductive unit 214. Excess power and steam go to the destination facility 238. Cogeneration present as shown this embodiment, may or may not be desired in other embodiments. It is contemplated that some facilities or mines have sufficient power and no need to increase with cogeneration.

Figure 3:
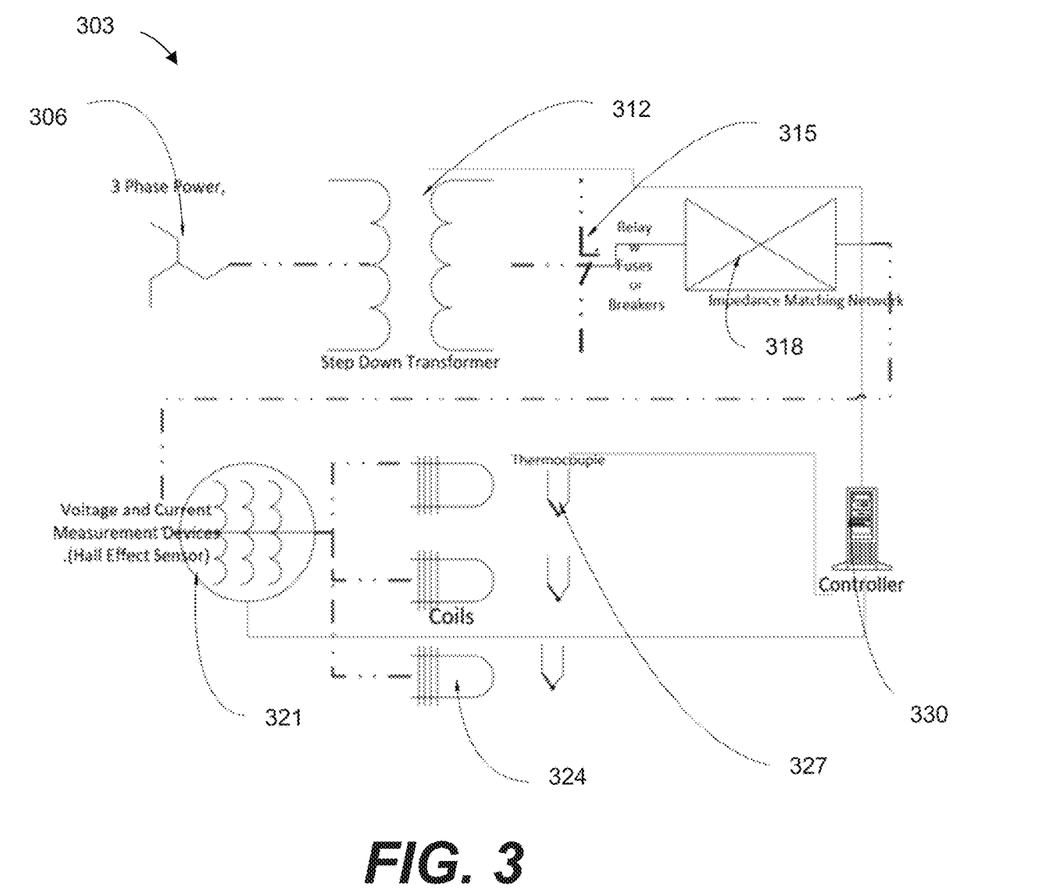
FIG. 3 is a diagram that illustrates an example control circuit of an inductive heater according to one embodiment of the present disclosure.

FIG. 3 shows an inductive unit with an example control circuit 303. The control circuit 303 can include a transformer 312, relay with fuses or breakers 315, impedance matching network 318, meters 321 that can measure the voltage and current, (such as Hall Effect sensors), one or more thermocouples 327 (e.g., for each inductive element), and a controller 330. The control circuit 303 can be connected to a power supply 306 and heating coils 324, which can include inductive elements like the inductive elements 106 and 112 of FIG. 1A. Thermocouples 330 and the meters 321 can communicate with the controller 330, and the controller 330 can gate, limit, or control the heating temperature and the power delivered based on the meters 321 and the thermocouples 330. In one example, the controller 330 can open or close relays or switches, and can control or adjust other circuit components of the control circuit 303 like variable resistances, reactances, capacitances, inductances, and the like. The control circuit 303 can measure a temperature of the inductive coils (e.g., using the thermocouples or another measuring device) and control the inductive coils to maintain the temperature below (or above) a predefined threshold temperature or at a particular temperature or within a particular temperature range. The control circuit 303 can measure the temperature of each of the inductive coils in the system independently, and can adjust power or other circuit components in order to individually control each of the inductive coils in the system. The control circuit 303 can control each inductive element to maintain a same predefined threshold temperature, or control each inductive element to maintain its own individual predefined threshold temperature, such that one inductive coil is set to have a higher threshold temperature than another inductive coil in the system.

The transformer 312 may not be necessary in some embodiments if the line power is clean and appropriate for direct use. The relays and breakers or fuses 515 can allow for soft switching by initial use of lower current and/or voltage and once the connection is made, increasing current and/or voltage. The power source can be utility power. However, other energy sources in other embodiments may be used (e.g., an electrical generator or fuel cell). When practical the natural frequency of the line can be utilized, although it may be factored or multiplied in some embodiments. For example, line frequency of 60 hertz may be factored to 120 hertz or 240 hertz as the engineering finds expedient. While low frequencies (e.g., utility frequencies like 50 Hz, 60 Hz, 140 Hz, 400 Hz are contemplated for most embodiments, higher frequencies may be utilized as desired for the application. In other embodiments, other frequencies may be employed, such as 500 kHz and other frequencies including non-line or non-utility frequencies. Any suitable induction power generator is acceptable.

The impedance matching network 318 can provide for good energy transfer, and can be adjusted by the controller 330 in view of the inductive coils 324. In some embodiments like in line fluid heating as in FIG. 1 and FIG. 2, the coils are wrapped around the transportation pipe or transportation pipe assembly. In other embodiments, the coils are wrapped around larger tanks or vessels, or the coil can be a "pancake coil" that is coiled flat to the surface of a tank or other surface.

In some embodiments, but not all embodiments, insulation can be used to regulate temperature and heat escaping the pipes. In some embodiments, heating waste oil inline, the heat generated by the coils and power supply can be captured by the heat exchange fluid that is inside the enclosure that can surround the coils, as well as the power unit. The heat exchange fluid can be water or other liquids, air or other gasses, or another fluid. The heat exchange fluid can be routed through pre-heater in a heat exchange arrangement to capture the heat and preheat the waste oil or other fluids before they enter the inductively heated sections.

Figure 4:
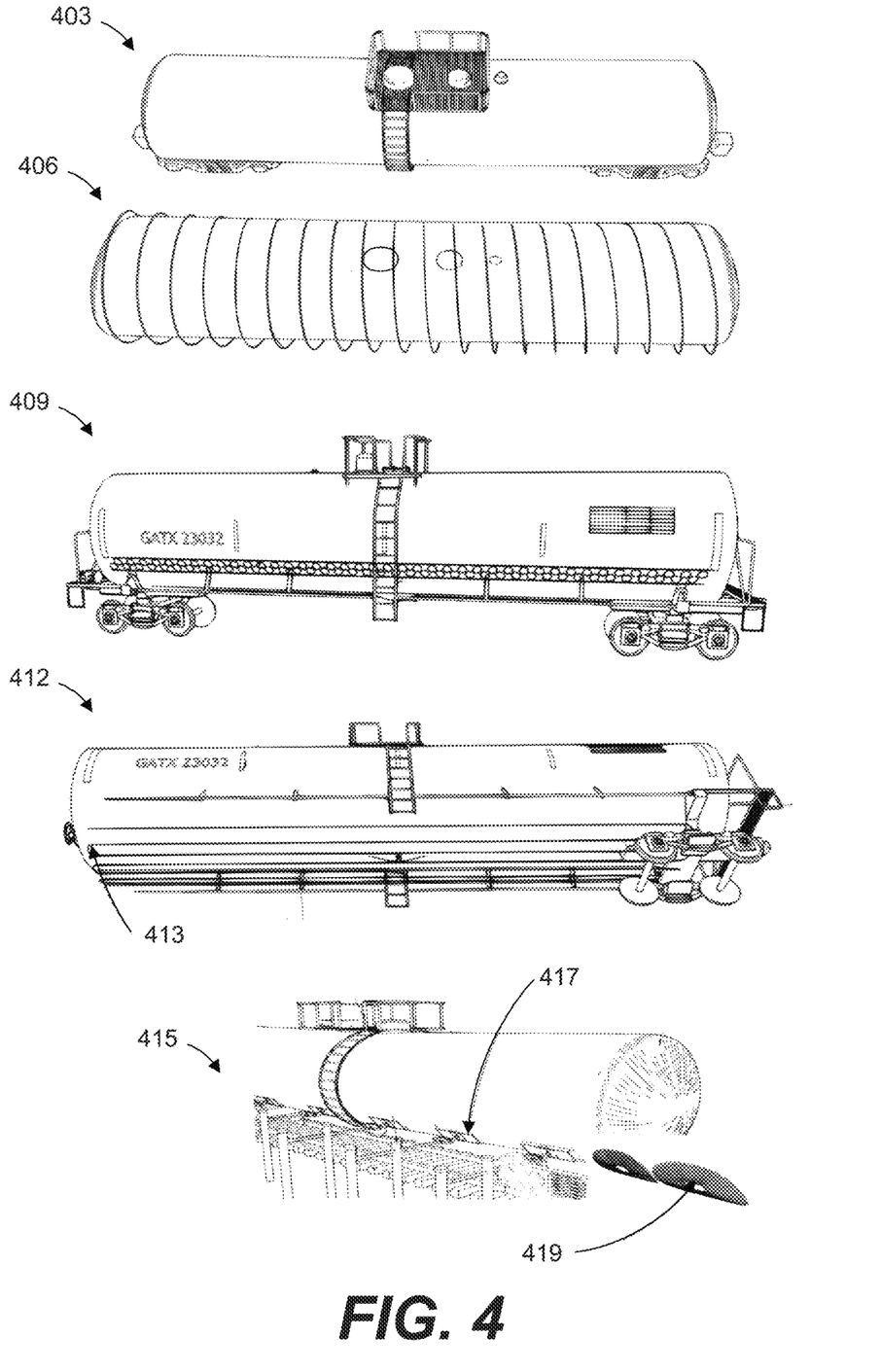
FIG. 4 illustrates various examples of transportation tanks according to the embodiments of the present disclosure.

In FIG. 4, shown are various examples of transportation tanks according to the embodiments of the present disclosure. A transportation tank 403 can have no inductive elements. A transportation tank 406 can include one or more helical or coil inductive element. A transportation tank 409 can include pancake coils radially mounted to the sides of the transportation tank 409. A transportation tank 412 can include serpentine inductive elements 413 that can, for example, be longitudinally mounted or extend along the bottom and other sides of the transportation tank 412, and can have bends or turns at the ends of the portion that extends along the tank.

A docking station 415 can allow inductive heating for any of the transportation tanks, including the transportation tank 403 having no inductive elements, which can be temporarily fitted with inductive elements at the docking station 415 of the inductive transportation system. The transportation tank can be near the dock, and telescoping or otherwise extendable arms of the docking station can extend the pancake inductive elements 419 or other inductive elements to the transportation tank for heating while at the facility, be it the mine or storage facility 200 or the destination facility 238, or another facility of the system. Other transportation tanks can include other inductive elements, or a combination of inductive elements. Any of the transportation tanks can be connected to an inductive unit as described in FIGS. 2 and 3. Where the transportation tank has its own inductive heating elements installed, such as for the transportation tanks 406, 409, and 412, the docking station can include wires or cables connected to an inductive unit 214 to power and control heating using the inductive elements. The heating of each transportation tank can thereby be maintained over a particular threshold temperature, under a particular threshold temperature, or within a particular range of temperatures.

Figure 5:
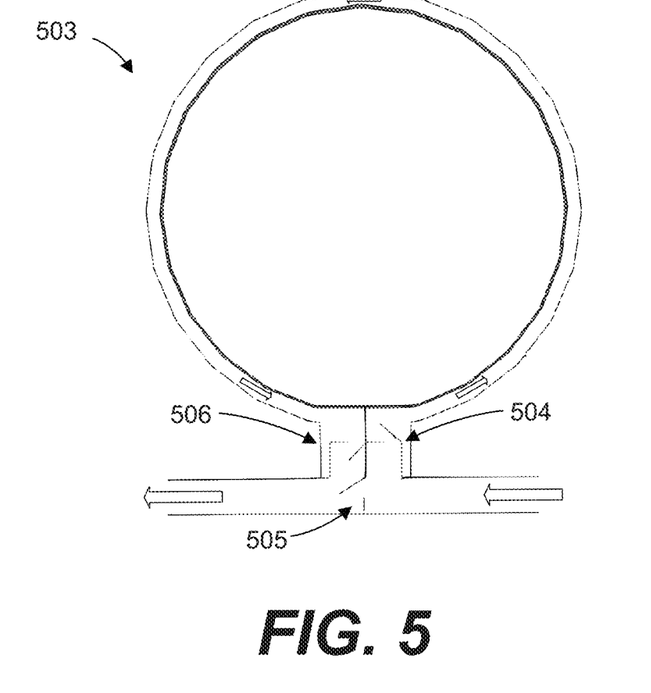
FIG. 5 illustrates an example of a liquid-cooled inductive coil according to the embodiments of the present disclosure.

In FIG. 5, shown is an example of a liquid-cooled inductive element 503 (or gas-cooled) according to the embodiments of the present disclosure. The liquid-cooled inductive element 503 can be representative of or included in any of the inductive elements discussed herein. Other inductive elements may not be as shown in FIG. 5, and can be air cooled or liquid cooled in another manner. Liquid (e.g., water) can be circulated through an interior cavity of the inductive element 503, for example, in the direction indicated. The liquid or gas can serve to cool the inductive element 503. Various valves, including the valves 504, 505, and 506 can force or guide a gas or liquid to travel, for example, in the direction of travel as indicated by the arrows. If desired the valves 504, 505, and/or 506 can include a Venturi Nozzle as part of a valve assembly, which can give force to the direction of flow. In some cases, one or more of the valves, such as the valve 505, can be absent, and/or closed.

Figure 6:
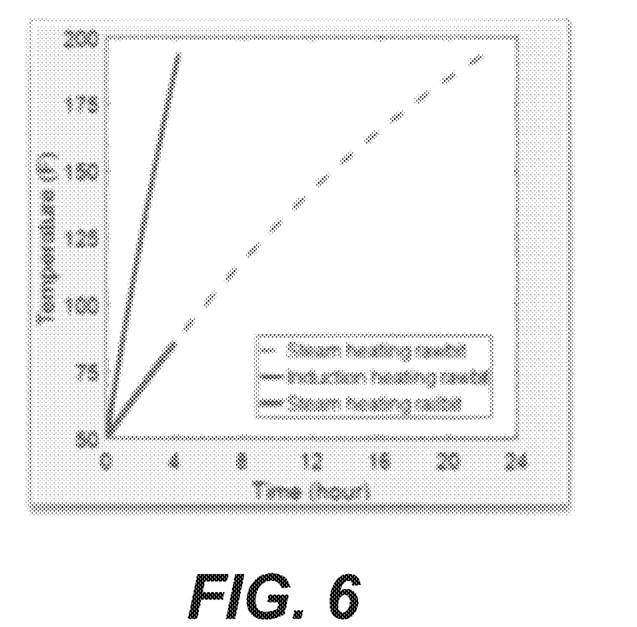
FIG. 6 is a graph that illustrates example comparison that includes example inductive heating results according to the embodiments of the present disclosure.

FIG. 6 is a graph that illustrates an example comparison that includes inductive heating results and examples results of steam heating.

As used herein, the term "approximate," or "approximately" can refer to a distance or measure that differs by about 30% or less, about 25% or less, about 20% or less, about 15% or less, about 10% or less, or about 5% or less than the indicated distance or measure. The term "or less" can indicate a range that extends to 0% or to 0.01%. As used herein, the term "similar to," for example in the phrase "diameter similar to," or other such phrases can refer to diameter that differs by about 30% or less, about 25% or less, about 20% or less, about 15% or less, about 10% or less, or about 5% or less. The term "or less" can indicate a range that extends to 0% or to 0.01%.

Although embodiments have been described herein in detail, the descriptions are by way of example. The features of the embodiments described herein are representative and, in alternative embodiments, certain features and elements may be added or omitted. Additionally, modifications to aspects of the embodiments described herein may be made by those skilled in the art without departing from the spirit and scope of the present invention defined in the following claims, the scope of which are to be accorded the broadest interpretation so as to encompass modifications and equivalent structures.

Therefore, at least the following is claimed:

1. A transportation piping assembly comprising:
   a first transportation pipe having a first diameter and a first inductive element that heats the first transportation pipe;
   a second transportation pipe having a second diameter and a second inductive element that heats the second transportation pipe, wherein the first diameter of the first transportation pipe is greater than the second diameter of the second transportation pipe;
   an entrance funnel connected to a top of the first transportation pipe and feeding a fluid into the first transportation pipe;
   an exit element that is configured to inject fluid into a transportation tank; and
   a control circuit, the control circuit being electrically coupled to the first inductive element and the second inductive element, and to a power supply to inductively heat the first transportation pipe and the second transportation pipe, wherein the control circuit measures a temperature using a thermocouple and controls the first inductive element to maintain the temperature below a predefined threshold temperature.

2. The transportation piping assembly of claim 1, wherein the control circuit causes the second transportation pipe to be heated to a predefined temperature in a range between approximately 200° C.-300° C.

3. The transportation piping assembly of claim 1, further comprising an augur within the first transportation pipe, wherein a rotation of the augur causes a fluid flow within the transportation piping assembly.

4. The transportation piping assembly of claim 1, further comprising a third transportation pipe having a third diameter and a third inductive element that heats the third transportation pipe wherein the third transportation pipe is connected between the first transportation pipe and the second transportation pipe, and the first diameter is greater than the third diameter, and the third diameter is greater than the second diameter.

5. The transportation piping assembly of claim 4, further comprising another augur within the third transportation pipe, wherein the augur causes a first flow rate, the another augur causes a second flow rate, and the first flow rate is similar to the second flow rate.

6. The transportation piping assembly of claim 1, wherein the first inductive element is a liquid-cooled inductive element comprising at least one valve assembly.

7. The transportation piping assembly of claim 1, further comprising a positive displacement pump that causes a fluid flow within the transportation piping assembly.

8. A system for fluid transportation, comprising:
   a first transportation pipe having a first diameter and a first inductive element;
   a second transportation pipe having a second diameter and a second inductive element, wherein the first diameter of the first transportation pipe is greater than the second diameter of the second transportation pipe;
   an exit element that is configured to inject fluid into a transportation tank; and
   a control circuit, the control circuit being electrically coupled to the first inductive element and the second inductive element, and to a power supply to inductively heat the first transportation pipe and the second transportation pipe.

9. The system for fluid transportation of claim 8, wherein the control circuit causes the second transportation pipe to be heated to a predefined threshold temperature that is over 450° C.

10. The system for fluid transportation of claim 8, further comprising:
    an augur within the first transportation pipe, wherein a rotation of the augur causes a fluid flow; and
    an entrance funnel connected to a top of the first transportation pipe and feeding a fluid over the augur and into the first transportation pipe.

11. The system for fluid transportation of claim 8, further comprising a third transportation pipe having a third diameter and a third inductive element that heats the third transportation pipe wherein the third transportation pipe is connected between the first transportation pipe and the second transportation pipe, and the first diameter is greater than the third diameter, and the third diameter is greater than the second diameter.

12. The system for fluid transportation of claim 8, further comprising:
    an augur within the first transportation pipe, wherein a rotation of the augur causes a fluid flow; and
    an entrance funnel connected to a top of the first transportation pipe and feeding a fluid over the augur and into the first transportation pipe.

13. The system for fluid transportation of claim 8, further comprising a plurality of feeding transportation pipes that feed into the first transportation pipe, wherein the first diameter of the first transportation pipe is greater than a diameter of respective ones of the plurality of feeding transportation pipes.

14. The system for fluid transportation of claim 8, further comprising a transportation tank that includes a third inductive element.

15. The system for fluid transportation of claim 8, further comprising a chopping device that feeds the fluid into the first transportation pipe.

* * * * *